US012608536B2

(12) United States Patent
Myers et al.

(10) Patent No.: US 12,608,536 B2
(45) Date of Patent: Apr. 21, 2026

(54) USING DATA SUBMITTED FOR A FIELD TO POPULATE A DIFFERENT, ASSOCIATED FIELD

(71) Applicant: Oracle International Corporation, Redwood Shores, CA (US)

(72) Inventors: Dylan Myers, Coral Gables, FL (US); Li Pang, White Rock (CA)

(73) Assignee: Oracle International Corporation, Redwood Shores, CA (US)

( * ) Notice: Subject to any disclaimer, the term of this patent is extended or adjusted under 35 U.S.C. 154(b) by 153 days.

(21) Appl. No.: 18/523,631

(22) Filed: Nov. 29, 2023

(65) Prior Publication Data

US 2025/0173502 A1     May 29, 2025

(51) Int. Cl.
G06F 40/174      (2020.01)
G06F 3/04842     (2022.01)
G06N 20/00       (2019.01)

(52) U.S. Cl.
CPC ........ G06F 40/174 (2020.01); G06F 3/04842 (2013.01); G06N 20/00 (2019.01)

(58) Field of Classification Search
CPC .... G06F 40/174; G06F 3/04842; G06N 20/00
See application file for complete search history.

(56) References Cited

U.S. PATENT DOCUMENTS 5,774,868 A *   6/1998   Cragun .............. G06Q 30/0207
                                                       705/14.1
7,254,569 B2 *  8/2007   Goodman ............. G06F 40/174

| 7,343,551 | B1 * | 3/2008 | Bourdev ................. G06F 40/30 |
| | | | 715/224 |
| 7,644,351 | B1 * | 1/2010 | Portnoy ................ G06F 40/174 |
| | | | 715/224 |
| 8,949,254 | B1 * | 2/2015 | De Datta ................ G06F 16/93 |
| | | | 707/751 |
| 9,116,872 | B1 * | 8/2015 | Channakeshava .. G06F 16/9535 |
| 10,686,772 | B2 | 6/2020 | Haddad |
| 2002/0133436 | A1 * | 9/2002 | Hermreck .............. G06Q 40/12 |
| | | | 705/31 |
| 2003/0105642 | A1 * | 6/2003 | Andino, Jr. .......... G06Q 10/105 |
| | | | 705/321 |
| 2004/0205530 | A1 * | 10/2004 | Borg ..................... G06F 40/174 |
| | | | 715/234 |

(Continued)

OTHER PUBLICATIONS

"Generating multiple types of documents from the same form", Retrieved from https://support.form-publisher.com/hc/en-us/articles/360006694620, Jan. 2, 2023, pp. 8.

(Continued)

*Primary Examiner* — Justin R. Blaufeld
(74) *Attorney, Agent, or Firm* — Invoke

(57)                ABSTRACT

Techniques for populating the fields of a form are disclosed. A machine learning model may be trained to predict associations between fields. The trained machine learning model may be applied to a plurality of forms to predict an association between a first field in a first form type and a second field in a second form type. Upon receiving a value for a first field in a first form of a first form type and based on the predicted association, the system may populate a second field of a second form of the second form type based on the value.

20 Claims, 6 Drawing Sheets

(56) References Cited

U.S. PATENT DOCUMENTS

| | | | |
|---|---|---|---|
| 2008/0066020 A1* | 3/2008 | Boss | G06F 40/174 |
| | | | 715/780 |
| 2008/0147528 A1* | 6/2008 | Talan | G06F 40/174 |
| | | | 705/31 |
| 2014/0040717 A1* | 2/2014 | Piratla | G06F 40/174 |
| | | | 707/755 |
| 2016/0019197 A1* | 1/2016 | Iasi | G06F 40/174 |
| | | | 715/224 |
| 2018/0018311 A1* | 1/2018 | Mukherjee | G06Q 40/123 |
| 2020/0104733 A1* | 4/2020 | Bart | G06N 3/0499 |
| 2020/0250550 A1* | 8/2020 | Bissell | G06F 3/0481 |
| 2020/0342221 A1 | 10/2020 | Sampath et al. | |
| 2023/0005616 A1* | 1/2023 | Zhang | G16H 50/20 |
| 2024/0303418 A1* | 9/2024 | Daniel | G06F 40/174 |
| 2025/0138502 A1* | 5/2025 | Patel | G06F 8/33 |

OTHER PUBLICATIONS

"How to Create a Client Intake Form that Improves Onboarding with Formspree + Airtable", Retrieved from https://formspree.io/blog/client-intake-form/, Jan. 2, 2023, pp. 12.
"Manage incoming work the smart way", Retrieved from https://asana.com/features/workflow-automation/forms, Jan. 2, 2023, pp. 5.
"Merge Forms Data into Tasks List Export and Import Flows", Retrieved from https://www.kalmstrom.com/Tips/SharePoint-Flows/Flow-Orders-to-Tasks.htm, Jan. 2, 2023, pp. 2.
Leonhardt, "Filling Out Multiple Forms at Once", Retrieved from https://start.docuware.com/blog/product%20news/filling-out-multiple-forms-at-once, Apr. 22, 2019, pp. 6.
Morse J., "Advanced: Pre-fill your Intake Form fields", Retrieved from http://kb.appointlet.help/en/articles/5031004-using-url-parameters-to-pre-fill-form-fields, Jan. 2, 2023, pp. 4.

* cited by examiner

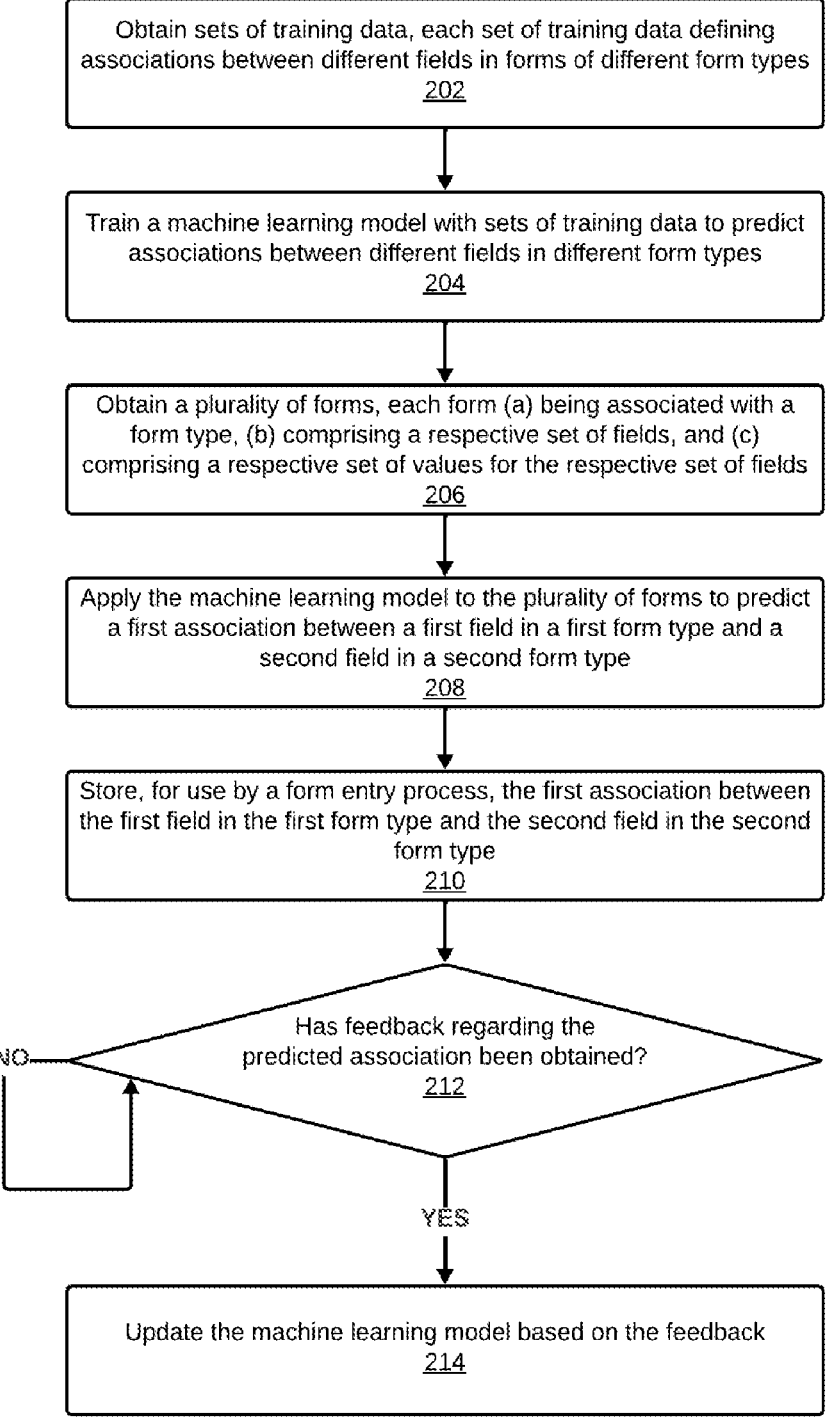

Obtain sets of training data, each set of training data defining associations between different fields in forms of different form types
202

Train a machine learning model with sets of training data to predict associations between different fields in different form types
204

Obtain a plurality of forms, each form (a) being associated with a form type, (b) comprising a respective set of fields, and (c) comprising a respective set of values for the respective set of fields
206

Apply the machine learning model to the plurality of forms to predict a first association between a first field in a first form type and a second field in a second form type
208

Store, for use by a form entry process, the first association between the first field in the first form type and the second field in the second form type
210

Has feedback regarding the predicted association been obtained?
212

NO

YES

Update the machine learning model based on the feedback
214

FIG. 2

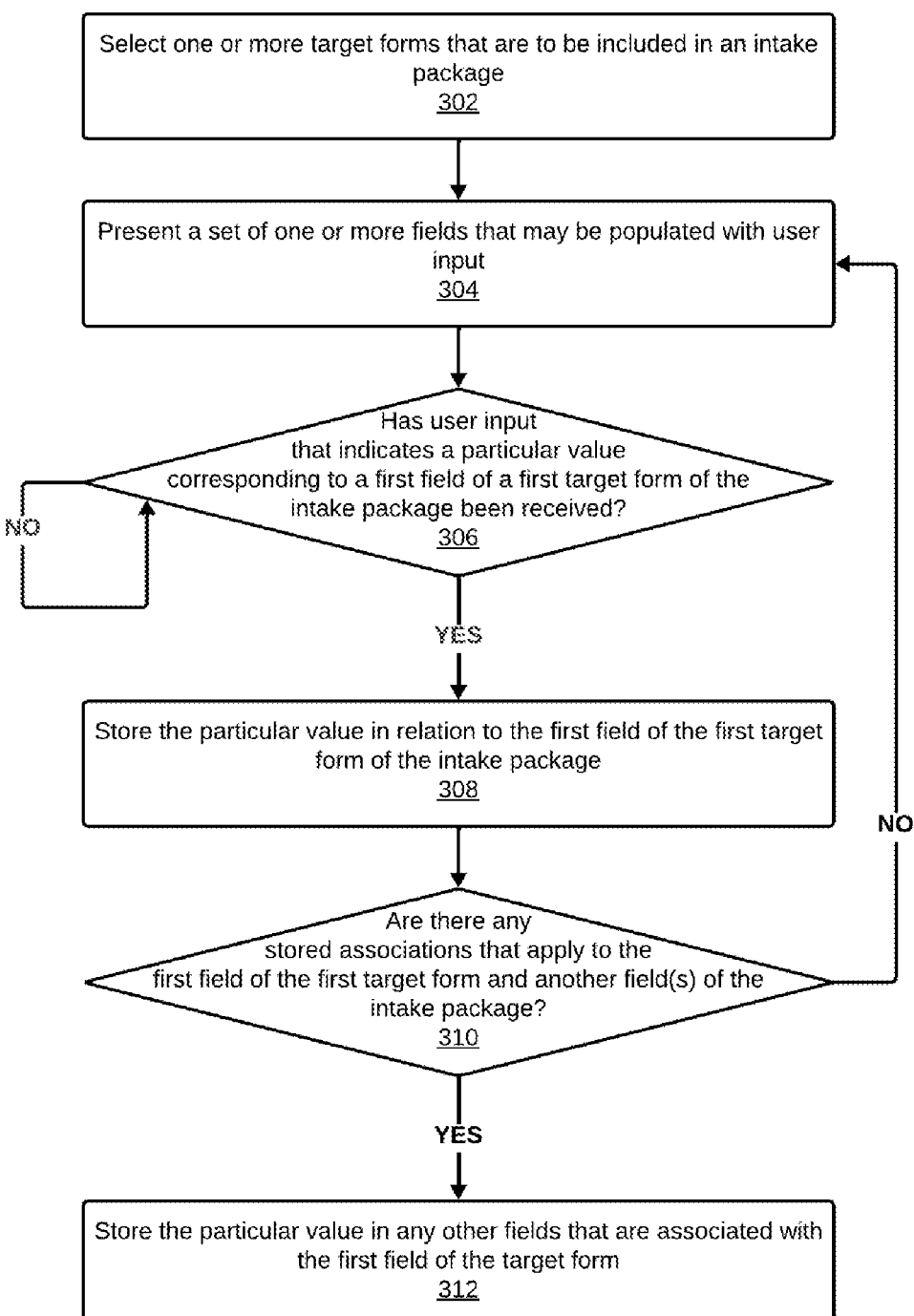

Select one or more target forms that are to be included in an intake package
302

Present a set of one or more fields that may be populated with user input
304

Has user input that indicates a particular value corresponding to a first field of a first target form of the intake package been received?
306

NO

YES

Store the particular value in relation to the first field of the first target form of the intake package
308

Are there any stored associations that apply to the first field of the first target form and another field(s) of the intake package?
310

NO

YES

Store the particular value in any other fields that are associated with the first field of the target form
312

FIG. 3

USING DATA SUBMITTED FOR A FIELD TO POPULATE A DIFFERENT, ASSOCIATED FIELD

TECHNICAL FIELD

The present disclosure relates to populating fields in the forms of an intake package using machine learning.

BACKGROUND

Completing a form may require populating many fields, and scenarios often arise in which an individual needs to complete multiple forms. For example, an individual who wishes to open a business may need to apply for various licenses, permits, certifications, and/or other administrative approvals. In another example, an individual who wishes to open a restaurant may need to apply for a business entity registration, a health department permit, a restaurant license, a catering license, an alcohol license, a permit for outdoor dining, a sign permit, a sales tax permit, zoning and land use approvals, building and fire code certification, health and safety certification, food service manager certification, a federal employer identification number, and/or other administrative approvals. Each application may require that the applicant complete multiple forms.

An entity that processes applications for administrative approvals may group multiple forms into an intake package. For example, a government agency that regulates restaurants may group the forms that are needed to open a restaurant into an intake package. In this example, an individual who wishes to open a restaurant may complete the intake package in the course of a form entry process.

An intake package may be completed by populating the required fields of the forms with the requisite values. It may be that many of the required fields need to be populated with data that is common across the fields (referred to herein as "common data"). For example, an individual who is completing an intake package may need to populate multiple fields in multiple forms with the same value. Populating many fields with the same common data may be time-consuming and tedious.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example set of operations for predicting an association between fields in accordance with one or more embodiments;

FIG. 3 illustrates an example set of operations for populating an associated field in accordance with one or more embodiments;

DETAILED DESCRIPTION

Figure 1:
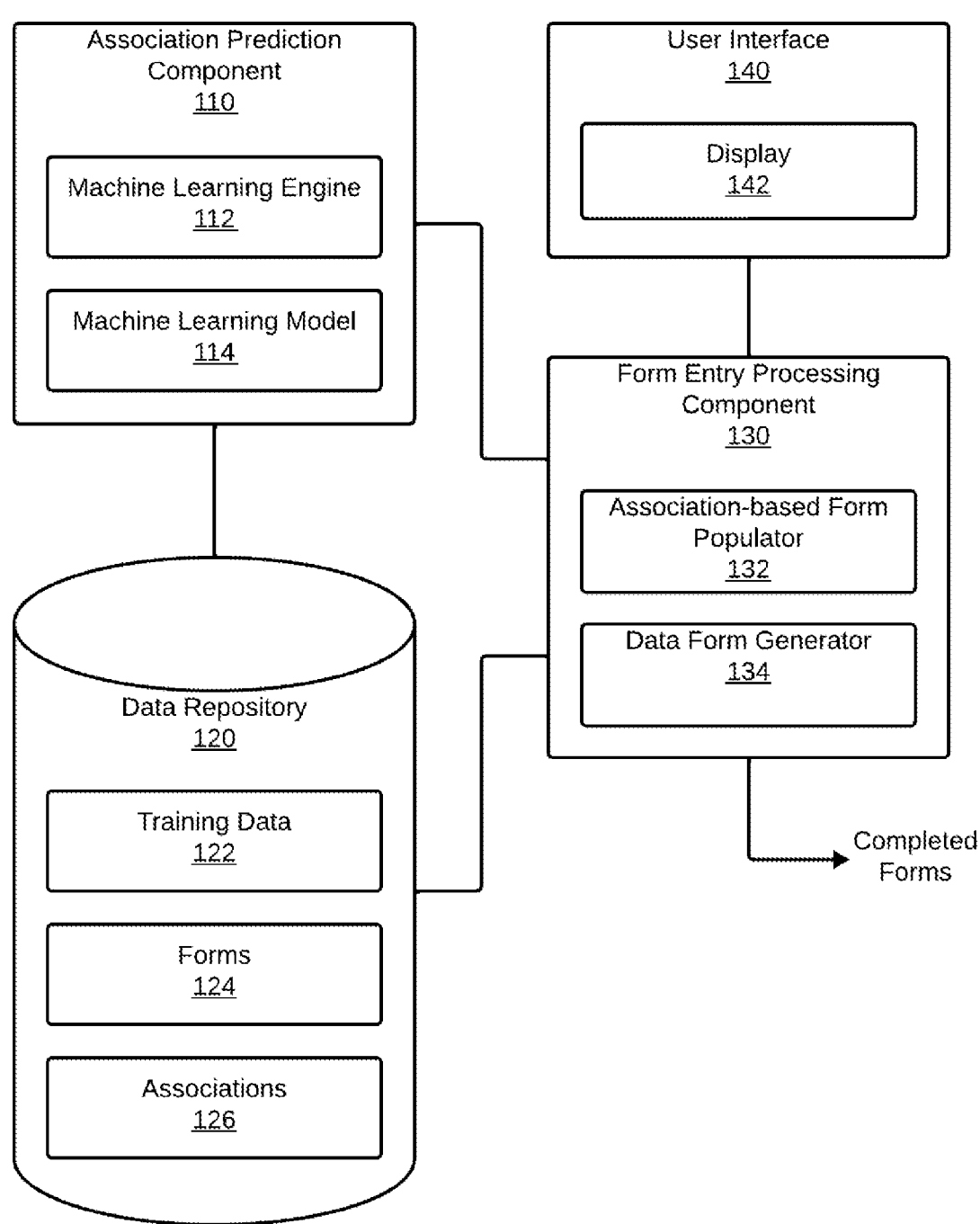
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present invention.

The following table of contents is provided for the reader's convenience and is not intended to define the limits of the disclosure.

1. GENERAL OVERVIEW
2. SYSTEM ARCHITECTURE
3. PREDICTING AN ASSOCIATION BETWEEN FIELDS
4. POPULATING AN ASSOCIATED FIELD
5. GENERATING A DATA FORM
6. RECOMMENDING A FIELD TO BE POPULATED BY THE SYSTEM
7. COMPUTER NETWORKS AND CLOUD NETWORKS
8. MICROSERVICE APPLICATIONS
  8.1 TRIGGERS
  8.2 ACTIONS
9. HARDWARE OVERVIEW
10. MISCELLANEOUS EXTENSIONS

1. General Overview

One or more embodiments predict an association between fields in different forms of respective form types. Based on the predicted association, the system populates the field of a form based on user input received for another, associated field in a different form.

One or more embodiments apply a machine learning model to a field of a form to predict that the field is associated with another field in another form. The system trains the machine learning model using sets of training data. A set of training data may include a pair of forms and information identifying an association between fields in respective forms of the pair of forms. The system applies the machine learning model to a first field of an initial form for which user input has been received. Based on the first field, the machine learning model predicts that a second field of another form is associated with the first field of the initial form. The system then populates the second field based at least in part on the user input that has been received with respect to the first field of the initial form. Feedback indicating that a predicted association is correct or incorrect may be used to retrain and/or update the machine learning model. The machine learning model may be implemented on a per user basis, or per user category basis. Accordingly, the associations between fields determined for one user may be different than the associations between fields determined for another user.

In an embodiment, the system determines that a first field in a first form is associated with a second field in a second form based in part on determining an association between a first form type corresponding to the first form and a second form type corresponding to the second form. In an example, the system determines a frequency with which forms of the first form type are submitted with forms of the second form type. If the frequency meets a threshold criterion, the system determines an association between the first form type and the second form type. In response to the determination of the association between the form types, the system analyzes the fields for the forms of each form type to determine whether there is an association between a field in the forms of the first form type and a field in the forms of the second form type.

One or more embodiments include a Graphical User Interface (GUI) for presenting predicted associations for user approval. The system predicts an association between a first field in a first form of a first form type and a second field in a second form of a second form type. The system presents the predicted association, in a GUI, as a recommended association. If the system receives user input approving the predicted association, the system stores the predicted association as a confirmed association. The system then uses the user input received in relation to the first field in a first form for populating the second field in a second form.

In an embodiment, the system presents a visual indication, in relation to a field, to indicate that the field has been auto-populated by the system based on user input received in relation to another associated field. Presenting the visual indication in relation to the field may include highlighting the field in a particular color, annotating the field with a note, or animating a presentation of the field. The system may utilize generative AI to create an explanation that indicates why an association has been predicted.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 may include association prediction component 110, data repository 120, form entry processing component 130, user interface 140, components thereof, and/or other components. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

Additional embodiments and/or examples relating to computer networks are described below in Section 7, titled "Computer Networks and Cloud Networks."

In an embodiment, association prediction component 110 may be utilized to predict associations between different fields in different form types. As illustrated in FIG. 1, association prediction component 110 may include machine learning engine 112, machine learning model 114, and/or other components.

In an embodiment, machine learning engine 112 may train one or more machine learning models. In an example, the training of machine learning models may be accomplished with one or more machine learning algorithms. A machine learning algorithm is an algorithm that can be iterated to learn a target model f that best maps a set of input variables to an output variable. In particular, a machine learning algorithm of machine learning engine 112 may be configured to generate and/or train machine learning model 114.

A machine learning algorithm is an algorithm that can be iterated to learn a target model f that best maps a set of input variables to an output variable using a set of training data. The training data includes datasets and associated labels. The datasets are associated with input variables for the target model f. The associated labels are associated with the output variable of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally or alternatively, a machine learning algorithm generates a target model f such that when the target model f is applied to the datasets of the training data, a maximum number of results determined by the target model f matches the labels of the training data. Different target models may be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, association prediction component 110 may predict associations by applying a machine learning model 114 to various inputs. Machine learning model 114 may predict associations between the fields in different form types. Machine learning model 114 may also predict associations between fields in the same form type. Inputs to machine learning model 114 may include data gathered from previous form entry processes. In an example, machine learning model 114 may be applied to a plurality of forms and/or other inputs. Machine learning model 114 may identify fields that tend to hold identical values, fields that tend to hold similar values, fields that tend to hold related values, fields that tend to be amended after the initial filing of an intake package, and/or other tendencies. Machine learning model 114 may identify relationships between form types. Machine learning model 114 may predict an association between two or more fields based on the two or more fields being included in related form types. In an example, machine learning model 114 may determine that a first form type is related to a second form type based on the two form types frequently being included in the same intake package. In this example, machine learning model 114 may predict that a first field is associated with a second field based on the first field being included in the first form type and the second field being included in the second form type. Machine learning model 114 may predict a conditional association between fields. For example, machine learning model 114 may predict that two fields are associated when a user possesses a particular user characteristic. For instance, a predicted association between a first field and a second field may be applicable if the user who is completing the intake package is an individual who is seeking to open a restaurant. If the user populates the first field with a particular value, and if the user is an individual who is seeking to open a restaurant, system 100 may determine that the association is applicable and populate the second field with the particular value. User characteristics may be determined based on values held by fields of forms, other user inputs and activity, and/or other data sources.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or executed on the same computing system as one or more other components of system 100. Additionally, or alternatively, a data repository 120 may be implemented or executed on a computing system separate from one or more other components of system 100. The data repository 120 may be communicatively coupled to association prediction component 110, form entry processing component 130, user interface 140, and/or other components of system 100 via a direct connection or via a network.

As illustrated in FIG. 1, data repository 120 may store training data 122, forms 124, associations 126, and/or other data. Information describing training data 122, forms 124, and/or associations 126 may be implemented across any of the components within the system 100. However, this information is illustrated within the data repository 120 for purposes of clarity and explanation.

In an embodiment, training data 122 may be utilized to train one or more machine learning models. For example, training data 122 may be utilized to train machine learning model 124. Training data 122 may include one or more sets of training data. A set of training data may define associations between different fields in different form types. Training data 122 may be obtained from previously completed form entry processes. Training data 122 may include feedback regarding past outputs of machine learning models. For example, training data 122 may include feedback regarding previously predicted associations between fields.

In an embodiment, forms 124 may be associated with form types and comprise fields. A field of a form may be populated with a value. Forms 124 may include forms that were populated in previous form entry processes. A plurality of forms 124 may be utilized as an input to machine learning model 114. Forms 124 may include blank forms, which may be selected as forms for inclusion in an intake package. In an example, forms 124 may be obtained from a tenant, which is a corporation, organization, enterprise, or other entity that accesses a shared computing resource. In this example, the tenant may be an entity that administrates a form entry process.

In an embodiment, associations 126 may be generated by system 100 and/or defined by a user of system 100. The system 100 may predict associations 126 by applying machine learning model 114. Associations 126 may be utilized in a form entry process. For example, an association 126 that was the output of an application of machine learning model 114 may be utilized by form entry processing component 130 to populate associated fields and/or to create data forms.

In an embodiment, form entry processing component 130 may facilitate the completion of a form entry process. As illustrated in FIG. 1, form entry processing component 130 may include prediction-based form populator 132 and data form generator 134.

In an embodiment, association-based form populator 132 may populate associated fields of target forms. For example, consider a first field of a first form type that is predicted to be associated with a second field of a second form type. If a user populates a first field of a first target form with a particular value, the association-based form populator 132 may automatically populate a second field of a second target form with the particular value if the first target form is of the first form type and the second target form is of the second form type. Additionally, or alternatively, association-based form populator 132 may populate associated fields subject to user input indicating approval. For example, consider a first field of a first form type that is predicted to be associated with a second field of a second form type. If a user populates a first field in a first target form with a particular value, system 100 may recommend that a second field of a second target form be populated based on the predicted association. In this example, association-based form populator 132 may populate the second field with the particular value upon system 100 receiving input from the user indicating approval of the predicted association.

Additional embodiments and/or examples relating to recommending fields to be populated by the system based on predicted associations are described below in Section 6, titled "Recommending a Field to be Populated by the System."

In an embodiment, data form generator 134 may generate a data form. A data form may include one or more fields. A field of a data form may correspond to associated fields. For example, consider a predicted association between a first field in a first form type and a second field in a second form type was stored. A corresponding data form may contain a data field that is mapped to the first field in the first form type and the second field in the second form type. In this example, if a user populates the data field with a particular value, the system may automatically populate a first field in a first target form and a second field in a second target form with the particular value. A data form may include multiple fields that respectively correspond to multiple associations.

A data form generated by data form generator 134 may include a field that does not correspond to an association. For example, a data form may include a field that corresponds to a single field in a single target form. It may be that every field of an intake package corresponds to a field of a data form. In this scenario, a user of system 100 may complete an intake package by completing the data form.

Data form generator 134 may generate a data form such that related fields are presented in proximity to one another. For example, consider a first field of a data form that is mapped to a first field of a first form type and a second field of a data form that is mapped to a second field of a second form type. Data form generator 134 may generate a data form in which the first field of the data form is presented in proximity to the second field of the data form based on a determination that the first field in the first form type is related to the second field in the second form type. The system 100 may determine a relationship between fields based on various criteria, such as a tendency to be populated with identical, similar, and/or related values, historical patterns of form completion, field attributes, natural language analysis, inclusion in related form types, and/or various other criteria.

Data form generator 134 may generate a data form autonomously. Additionally, or alternatively, data form generator 134 may generate a data form based on user input. For example, based on a predicted association, the system 100 may recommend that a candidate field be included in a data form. Generative AI may be used to generate an explanation that indicates why the recommendation is being made. If the system 100 receives user input that indicates approval of the predicted association, data form generator 134 may generate a data form that includes the candidate field. Additionally, or alternatively, data form generator 134 may generate a data form based on an association that was defined by a user of the system 100.

Additional embodiments and/or examples relating to data forms are described below in Section 5, titled "Generating a Data form."

In one or more embodiments, user interface 140 refers to hardware and/or software configured to facilitate communications between a user and system 100. User interface 140 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of user interface 140 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 140 is specified in one or more other languages, such as Java, C, or C++.

User interface 140 may represent one or more user interfaces. A user of system 100 may interact with user interface 140 to complete an intake package, to generate a data form, and/or for other purposes. In an example, a user of system 100 may interact with user interface 140 to populate a field of a form. In this example, user input received by user interface 140 may indicate a particular value corresponding to a field in a target form. The particular value may then be stored in relation to the field in the target form. In another example, a user of system 100 may interact with user interface 140 to indicate approval of a recommendation created by system 100. In yet another example, a user of system 100 may interact with user interface 140 to alter an association and/or define a new association.

In an embodiment, user interface may be associated with one or more components for presenting information to a user of system 100 such as display 142, which may be implemented on a digital device or otherwise. Display 142 may, for example, be a visual device, an audio device, an audio-visual device, and/or other devices. Examples of visual devices include monitors, televisions, projectors, and many others.

3. Predicting an Association Between Fields

FIG. 2 illustrates an example set of operations for predicting an association between fields in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In operation 202, one or more sets of training data may be obtained from a data repository of the system, another component of the system, a user of the system, an external data source, and/or other data sources. An example set of training data may define associations between different fields in forms of different types. The training data may include historical data. For example, the training data may include data that was obtained from previous form entry processes. Training data may include feedback regarding previous output(s) of a machine learning model(s). For example, a set of training data may include feedback regarding an association that was predicted between two or more fields by a previous application of a machine learning model.

In operation 204, a machine learning model may be trained to predict associations between fields of forms. In an example, a machine learning engine may be trained to predict an association between a first field in a first form type and a second field in a second form type. The machine learning model may be trained by a machine learning engine with training data obtained in operation 202.

In operation 206, a plurality of forms may be obtained from a data repository of the system, another component of the system, a user of the system, an external data source, and/or other data sources. The plurality of forms may include forms from previously completed intake packages. The obtaining of the plurality of forms may be facilitated by an application programming interface (API). For example, if the plurality of forms is obtained from a data source of a tenant, an API may be called to retrieve the plurality of forms using credentials supplied by the tenant.

In operation 208, an association between two or more fields may be predicted. For example, a first field in a first form type may be predicted to be associated with a second field in a second form type. Multiple associations may be predicted in this operation. Predictions of associations between fields may be generated by applying a machine learning model to various inputs. In an example, a machine learning model may be applied to the plurality of forms obtained in operation 206 and/or other inputs. In this example, each form of the plurality of forms may be associated with a form type, may include a respective set of fields, and may include a respective set of values for the respective set of fields. A prediction of an association between fields may be based on the values held by the fields in the plurality of forms. For instance, an association may be predicted between a first field in a first form type and a second field in a second form type if the first field and the second field tend to be populated with identical, similar, and/or related values.

A prediction of an association between fields may be based on a determination that the fields belong to related form types. For example, the system may determine that a first form type and a second form type are related because they are frequently included in the same intake package. Based on the determination that the first form type is related to the second form type, an association may be predicted between a first field in the first form type and a second field in the second form type.

A prediction of an association between fields may be based on attributes of the fields. For example, if a first field and a second field accept identical input types, have similar or identical character lengths, have similar or identical names, and/or share other similarities, the system may be more inclined to predict an association between the first field and the second field.

A prediction of an association may be based on patterns of form completion. For example, if a field is frequently amended after initial filing of an intake package, the system may be less inclined to predict an association that involves the field.

A prediction that is generated in the course of a form entry process may be based on inputs that are received in the course of a form entry process. For example, a user may populate a first field with a particular value, and the system may predict an association between the first field and a second field based on the particular value.

Natural language analysis may be utilized to analyze any natural language that may be found in a form. Natural language analysis may be applied to natural language that appears in blank forms and/or values that are populated into fields of forms. Analysis that utilizes natural language processing may be a basis for predicting associations between fields and/or determining relationships between form types.

A prediction of an association may be conditional, i.e., the system may predict that fields are associated if one or more conditions apply. In an example, the system may predict associations based on user characteristics, user activity, and/or other contexts. For instance, a first field may be predicted to be associated with a second field when a user possesses a particular user characteristic.

In operation 210, a predicted association between two or more fields may be stored for use in a form entry process. For example, an association between a first field in a first form type and a second field in a second form type that was predicted in operation 208 may be stored for use in a form entry process. Multiple associations may be stored in this operation. A predicted association may be stored in a data repository.

In operation 212, the system may proceed to another operation if feedback regarding a predicted association is obtained. For example, if feedback regarding the first association that was predicted in operation 208 is received (YES in operation 212), the system may proceed to operation 214. Alternatively, if no feedback is received (NO in operation 212), operation 212 may repeat. Feedback may be obtained from a user of the system, a component of the system, and/or from other sources. Feedback may be obtained through a user interface. In an example, user input indicating approval or disapproval of a recommendation generated by the system based on a predicted association may be a source of feedback. In another example, user input altering a value held by a field that was populated by the system may be a source of feedback.

In operation 214, the machine learning model may be updated based on any feedback obtained in operation 212. For example, if feedback regarding the first association was obtained in operation 212, the machine learning model may be further trained with training data that includes the obtained feedback.

4. Populating an Associated Field

FIG. 3 illustrates an example set of operations for populating an associated field. One or more operations illustrated in FIG. 3 may be modified, rearranged, or omitted all together. Accordingly, the particular sequence of operations illustrated in FIG. 3 should not be construed as limiting the scope of one or more embodiments.

In operation 302, one or more forms may be selected for inclusion in an intake package. The forms of the intake package may be selected by the system and/or by a user of the system. The system may select a form based on various criteria. In some examples, the system may apply a machine learning model to select forms.

A form may be selected based on historical data, a pattern of form completion, and/or an upcoming form completion requirement. For example, the system may select a form for renewing a permit based on determining that a user's current permit is soon to expire.

A form may be selected based on user characteristics obtained in the course of a form entry process. For example, based on user inputs, the system may determine that a user is seeking to open a restaurant. As a result, the system may select a form for applying for a restaurant license as a target form to be included in the intake package.

A form may be selected based on the form being related to a form that has already been included in an intake package. For example, if an intake package includes a form for applying for a catering license, the system may also select a form for applying for a restaurant license.

Natural language processing may be utilized by the system to select forms for inclusion in an intake package. For example, the system may receive natural language user input that recites "I want to open a restaurant." The system may use natural language processing to analyze the input. Based on the natural language analysis, the system may select a form for applying for a restaurant license.

A user may be queried by the system for information that can be used as a basis for selecting forms. To this end, the system may utilize generative AI to create queries that are tailored to a user. A query may be tailored to a user based on analysis of user inputs and activity. For example, the system may receive natural language input from a user that recites "I want to open a restaurant." The system may use natural language processing to analyze the user input. Based on the natural language analysis, the system may utilize generative artificial intelligence to create a query directed to the user that recites "Will the restaurant be serving alcohol?"

The system may select a form based on a value that is held by a field that was populated by a user. For example, consider a form for applying for a restaurant license. A user may populate a field of the form with a particular address where the restaurant will operate. Based on the value representing the address, the system may select an additional form for applying for a zoning permit that will be needed to operate a restaurant in the area where the address is located.

A form selected by the system in this operation may be included in an intake package without the system having received user input indicating approval of the selection. Additionally, or alternatively, a form selected by the system may be presented to a user as a candidate form for inclusion in the intake package. In the later scenario, the inclusion of the candidate form in the intake package may depend upon the system receiving user input indicating approval of the selection.

In operation 304, a field may be presented to a user. Multiple fields may be presented concurrently in this operation. A field presented in this operation may be presented by a display of a user interface. A user may interact with the user interface to populate a field that is presented by the display. Two or more different fields of two or more different forms may be presented concurrently in this operation based on a determination that the different fields and/or the different forms are related. A field of a target form may be presented in this operation. Additionally, or alternatively, a field that is presented in this operation may be a field of a data form.

Additional embodiments and/or examples relating to data forms are described below in Section 5, titled "Generating a Data form."

In operation 306, the system may proceed to another operation based on receiving input from a user. The system may receive user input through a user interface. User input may indicate a value to populate a field that is presented in operation 304. If, for example, input is received that indicates a particular value corresponding to a first field in a first target form (YES in operation 306), the system may proceed to operation 308. Alternatively, if input is not received (NO in operation 306), operation 306 may repeat.

In operation 308, a field of a target form may be populated based on user input. For example, a particular value indicated in user input that was received in operation 306 may be stored in relation to a first field in a first target form.

In operation 310, the system may proceed to another operation based on determining if there are any stored associations relating to a field that was populated in operation 308. For example, assume that a first field of a first target form was populated in an occurrence of operation 308. In this example, if the first field is associated with a second field that belongs to a second target form (YES in operation 310), the system may proceed to operation 312. Alternatively, if the first field of the first target form is not associated with any other field in a target form of the intake package (NO in operation 310), the system may return to operation 304.

In operation 312, the system may populate a field of a target form with a value that is held by an associated field. Consider, for example, an association that was predicted between a first field of a first form type and a second field of a second form type. In this example, assume that an intake package includes a first target form of the first form type and a second target form of the second form type. If a first field of the first target form holds a particular value, the system may populate a second field of the second target form with the particular value. Multiple fields may be populated in an occurrence of this operation. For example, the first field of the first form type may be associated with multiple fields in multiple form types. Consequently, multiple fields may be populated with a particular value that is held by the first field of the first target form. However, in this example, it may be that not every field that is associated with the first field will be populated.

A field may be conditionally populated in this operation. For example, consider an association that has been predicted between a first field in a first form type and a second field in a second form type. In this example, the predicted association may depend on one or more conditions. If the condition(s) is satisfied, the system may determine that the predicted association is applicable. If the system determines that the predicted association is applicable, the system may populate one or more fields based on the association.

The system may conditionally populate associated fields based on user characteristics, user input, user activity, and/or other contexts. For example, a conditional association may be predicted between a first field that requires a home address and a second field that requires a business address. In this example, if user input indicates that a user is seeking to obtain a license for a business that will be run from the user's home, the system may determine that the predicted association is applicable. As a result, the system may populate a second field in a second target form with the particular value that is held by a first field of a first target form.

Natural language processing may be utilized to analyze user input and/or other information. For instance, natural language processing may be utilized to analyze a particular value that is held by a first field in a first target form, and the system may conditionally populate a second field in a second target form based on the analysis of the particular value. In an example, a first field in a first target form and the second field in a second target form may both be fields in which the user is asked to provide a natural language input. For instance, the first field and the second field could both be fields in which the target user is asked to provide a natural language description or explanation. In this example, the system may use natural language processing to analyze the particular value that is held in the first field. Based on the analysis, the system may conditionally populate the second field with the particular value.

Additionally, or alternatively, the system may populate a field of a target form with a value that was derived from a value that is held by an associated field. A derived value may be generated based on a particular value indicated in user input that was received in operation 306 and/or other user input. For example, assume that user input indicating an address was received in operation 306. The system may determine the state where the address was located and populate a field with a value representing that state. Generative AI may be utilized to generate derived values.

The system may display a visual indication that a field has been populated with a value held by an associated field. Presenting the visual indication in relation to the field may include highlighting the field in a particular color, presenting the value in a particular color, annotating the field with a note, animating a presentation of the field, and/or other visual indications. In an example, assume that in an occurrence of operation 312, the system populates a second field in a second target form with a particular value that is held by a first field in a first target form. In this example, the second field may be presented in a different manner than the first field. Additionally, or alternatively, the representation of the particular value in the second field may be presented in a different manner than the representation of the particular value in the first field. For instance, the first field holding the particular value may be presented in a different color(s) than the second field holding the particular value.

The system may utilize generative AI to generate an explanation for why a field has been populated by the system. For example, assume that in an occurrence of this operation the system populates a second field in a second target form with a particular value that is held by a first field in a first target form. In this example, the system may utilize generative AI to generate an explanation for why the second field was populated by the system with the particular value.

Whether the system populates an associated field in this operation may be subject to user approval. For example, based on a predicted association, the system may generate a recommendation for a user that a second field in a second target form be populated with a particular value that is held by a first field in a first target form. The system may utilize generative AI to generate an explanation that indicates why the recommendation is being made. If the system receives user input indicating approval of the predicted association, the system may populate the second field with the particular value in this operation.

Additional embodiments and/or examples relating to recommending fields to be populated by the system are described below in Section 6, titled "Recommending a Field to be Populated by the System."

5. Generating a Data Form

Figure 4:
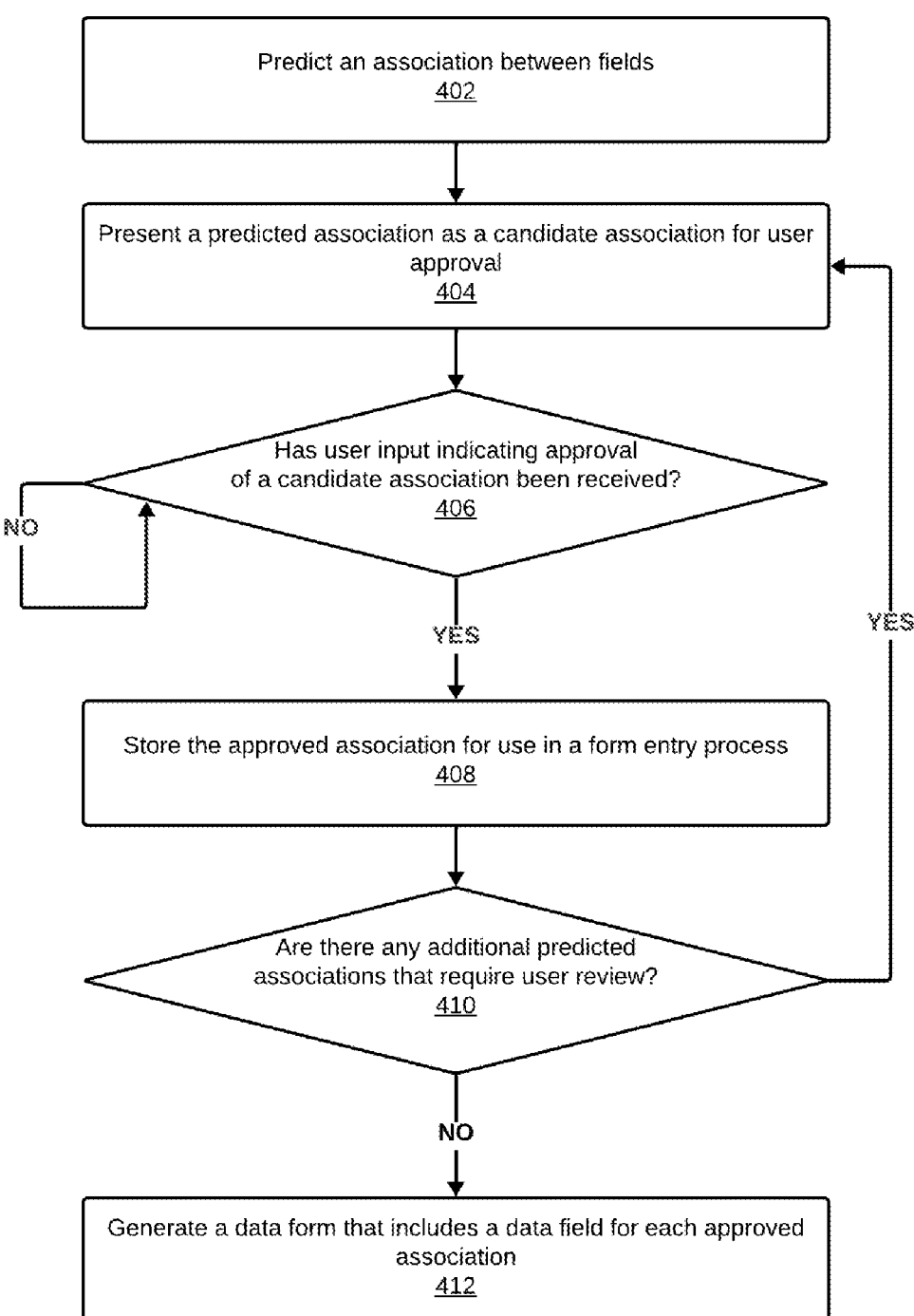
FIG. 4 illustrates an example set of operations for generating a data form in accordance with one or more embodiments.

FIG. 4 illustrates an example set of operations for generating a data form. One or more operations illustrated in FIG. 4 may be modified, rearranged, or omitted all together. Accordingly, the particular sequence of operations illustrated in FIG. 4 should not be construed as limiting the scope of one or more embodiments.

A detailed example is described below for purposes of clarity. Components and/or operations described below should be understood as one specific example which may not be applicable to certain embodiments. Accordingly, components and/or operations described below should not be construed as limiting the scope of any of the claims.

In operation 402, the system may predict an association between fields. In an example, an association may be predicted between a first field in a first form type and a second field in a second form type. Multiple associations may be predicted in this operation. Associations may be predicted based on various inputs. The system may generate a prediction of an association by applying a machine learning model. In an example, the system may predict an association based on associations that were defined by a user of the system in previous data forms.

Additional embodiments and/or examples relating to predicting associations are described above in Section 3, titled "Predicting an Association Between Fields."

In operation 404, a predicted association may be presented to a user as a candidate association for generating a data form. Multiple predicted associations may be presented in this operation. A candidate association may be presented on a display of a user interface. A user may interact with a user interface to indicate approval or disapproval of the candidate association, define new candidate associations, modify candidate associations, and/or to affect various other actions. For example, a user may interact with a user interface to add or remove fields that are included in a candidate association. Generative AI may be utilized to generate an explanation of why a candidate association was predicted. The explanation may be presented to a user in this operation. A predicted association presented as a candidate association in this operation may be conditioned upon one or more conditions. A user may interact with a user interface to add, delete, and/or alter conditions.

In operation 406, the system may proceed to another operation based on receiving user input. For example, if the system receives user input that indicates approval of a candidate association that was presented to the user in operation 404 (YES in operation 406), the system may proceed to operation 408. Alternatively, if no user input indicating approval of an association has been received (NO in operation 406), this operation may repeat.

In operation 408, an association may be stored for use in a form entry process. Multiple associations may be stored in this operation. An association may be stored in a data repository of the system. In an example, an association that was approved by a user in operation 406 may be stored in this operation. Additionally, or alternatively, the system may store associations that were not predicted by the system. For example, an association that was defined by a user of the system may be stored in this operation.

In operation 410, the system may proceed to another operation based on whether there are any candidate associations that still require user review. If, for example, there is a candidate association that still requires user review (YES in operation 410), the system may return to operation 404. Alternatively, if there are no additional candidate associations that still require user review (NO in operation 410), the system may proceed to operation 412. A candidate association may no longer require user review if user input indicating approval or disapproval of the candidate association has been received.

In operation 412, a data form may be generated. A field that is included in a data form may correspond to a stored association. For example, assume that an association between a first field in a first form type and a second field in a second form type was stored in operation 410. A data form that is generated based on the stored association may include a data field that is mapped to the first field in the first form type and the second field in the second form type. In this example, if a user populates the data field with a particular value, the system may populate a first field in a first target form and a second field in a second target form with the particular value.

A data form generated in the present operation may include a field that does not correspond to a predicted association. For example, a data form generated in this operation may include a field that corresponds to a single field in a single target form. In an example, every field in an intake package may correspond to a field of a data form generated in this operation. In this example, a user may complete an intake package by completing the data form.

The fields of a data form generated in this operation may be organized differently from the corresponding fields of the target forms. The fields of a data form may be organized based on relationships between the fields. For example, consider a first field of a data form that is mapped to a first field of a first form type and a second field of a data form that is mapped to a second field of a second form type. The first field of the data form may be presented in proximity to the second field of the data form based on a determination that the first field in the first form type is related to the second field in the second form type. A determination of a relationship between fields may be based on various criteria, such as a tendency to be populated with identical, similar, and/or related values, historical patterns of form completion, field attributes, natural language analysis, inclusion in related form types, and/or various other criteria.

A user may interact with a user interface to alter a data form generated in this operation. For example, a user may interact with a user interface to change the order that fields are presented in a data form.

6. Recommending a Field to be Populated by the System

Figure 5:
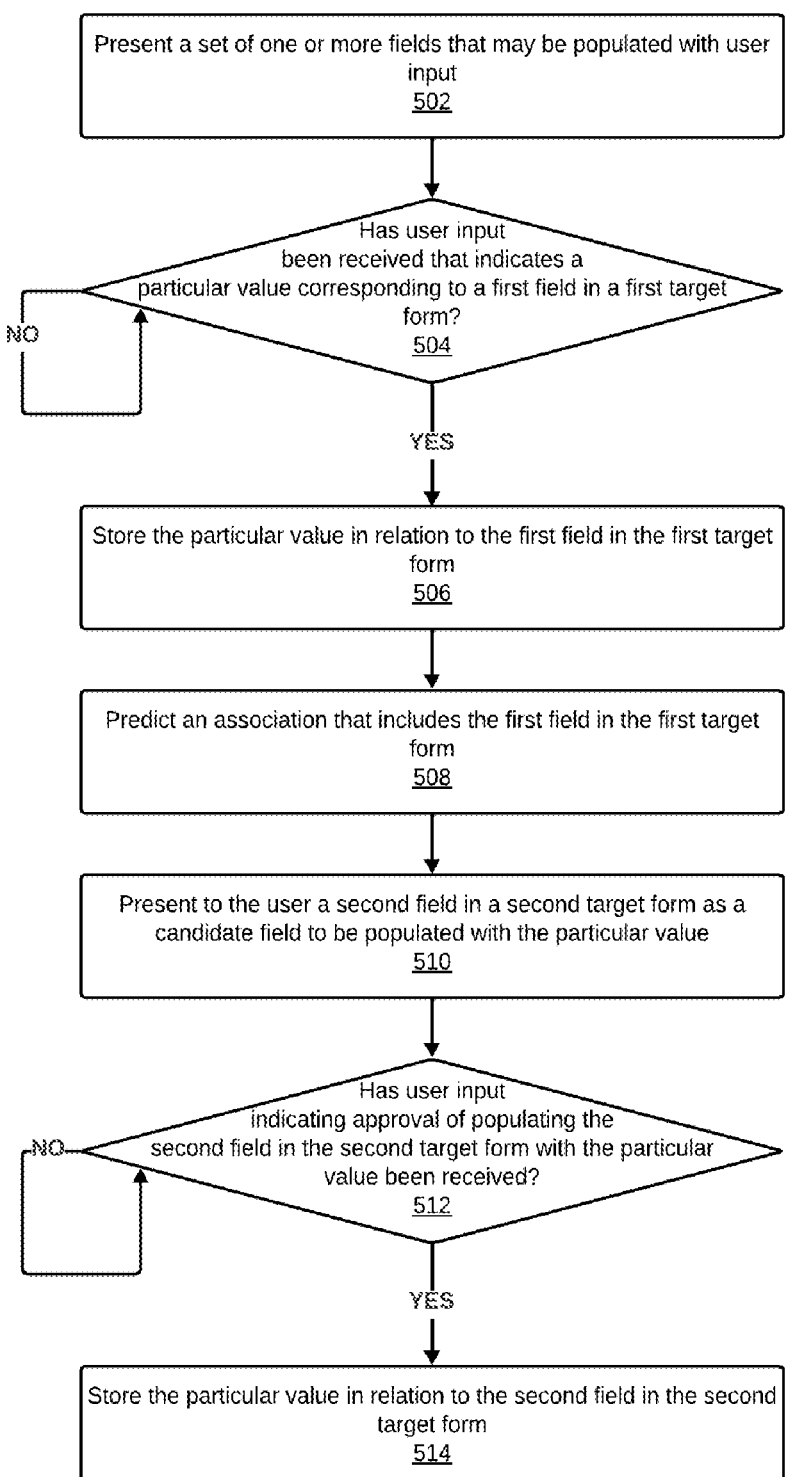
FIG. 5 illustrates an example set of operations for recommending a field to be populated by the system in accordance with one or more embodiments.

FIG. 5 illustrates an example set of operations for recommending a field to be populated by the system. One or more operations illustrated in FIG. 5 may be modified, rearranged, or omitted all together. Accordingly, the particular sequence of operations illustrated in FIG. 5 should not be construed as limiting the scope of one or more embodiments.

A detailed example is described below for purposes of clarity. Components and/or operations described below should be understood as one specific example that may not be applicable to certain embodiments. Accordingly, components and/or operations described below should not be construed as limiting the scope of any of the claims.

In operation 502, one or more fields may be presented to a user. Multiple fields may be presented concurrently in this operation. A field presented in this operation may be presented by a display of a user interface. A user may interact with the user interface to populate the fields that are presented by the display. Two or more different fields of two or more different forms may be presented concurrently in this operation based on a determination that the different fields and/or the different forms are related. A field that is presented in this operation may be a field of a target form. Additionally, or alternatively, a field that is presented in this operation may be a field of a data form.

In operation 504, the system may proceed to another operation based on receiving user input. For example, if user input is received that indicates a particular value corresponding to a first field in a first target form (YES in operation 504), the system may proceed to operation 506. Alternatively, if no user input indicating a particular value corresponding to a field in a target form is received (NO in operation 504), operation 504 may repeat.

In operation 506, a field of a target form may be populated based on user input. For example, a particular value indicated in user input that was received in operation 504 may be stored in relation to a first field in a first target form.

In operation 508, the system may predict an association between fields. Additionally, or alternatively, the system may retrieve stored associations that were predicted prior to this operation. The system may predict an association between the first field and the second field by applying a machine learning model to a plurality of forms and/or other inputs. The machine learning model may predict an association based on information that has been received in the course of the present form entry process. For instance, a prediction of an association may be based on the particular value that was received in operation 504 and/or other inputs received from a user.

Additional embodiments and/or examples relating to predicting associations are described above in Section 3, titled "Predicting an Association Between Fields."

In operation 510, the system may present to a user a recommendation that a field be populated by the system. The system may generate a recommendation based on an association that was predicted in operation 508. Additionally, or alternatively, the system may generate a recommendation based on a stored association that was retrieved in operation 508. For example, assume that a first field in a first target form holds a particular value. Based on a predicted association between a first field of a first form type and a second field of a second form type, the system may recommend that a second field of a second target form be populated with the particular value. In this example, the second field in the second target form may be presented as being populated with the particular value in a manner that is indicative of a recommendation. For instance, the second field may be highlighted in a particular color, the particular value may be presented in a different, the second field may be annotated with a note, and/or the presentation of the second field may be animated. The system may utilize generative AI to generate an explanation that indicates why a recommendation is being made. An explanation may be presented with a recommendation in this operation.

In operation 512, the system may proceed to another operation if user input regarding a recommendation is received. For example, if user input is received that indicates approval of a recommendation that was presented in operation 510 (YES in operation 512), the system may proceed to operation 514. Alternatively, if input is received that indicates disapproval of a recommendation that was presented in operation 510 (NO in operation 512), operation 512 may repeat. Input that is received in this operation may be utilized to further train a machine learning model that generated a prediction that was the basis for a recommendation.

In operation 514, an associated field may be populated based on approval of a recommendation. For example, assume that in operation 510 a user was presented with a recommendation that a second field in a second target form be populated with a particular value that is held by a first field in a first target form. In this example, if approval of the recommendation was received in operation 512, the system may populate the second field of the second target form with the particular value in this operation.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

8.1 Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

8.2 Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
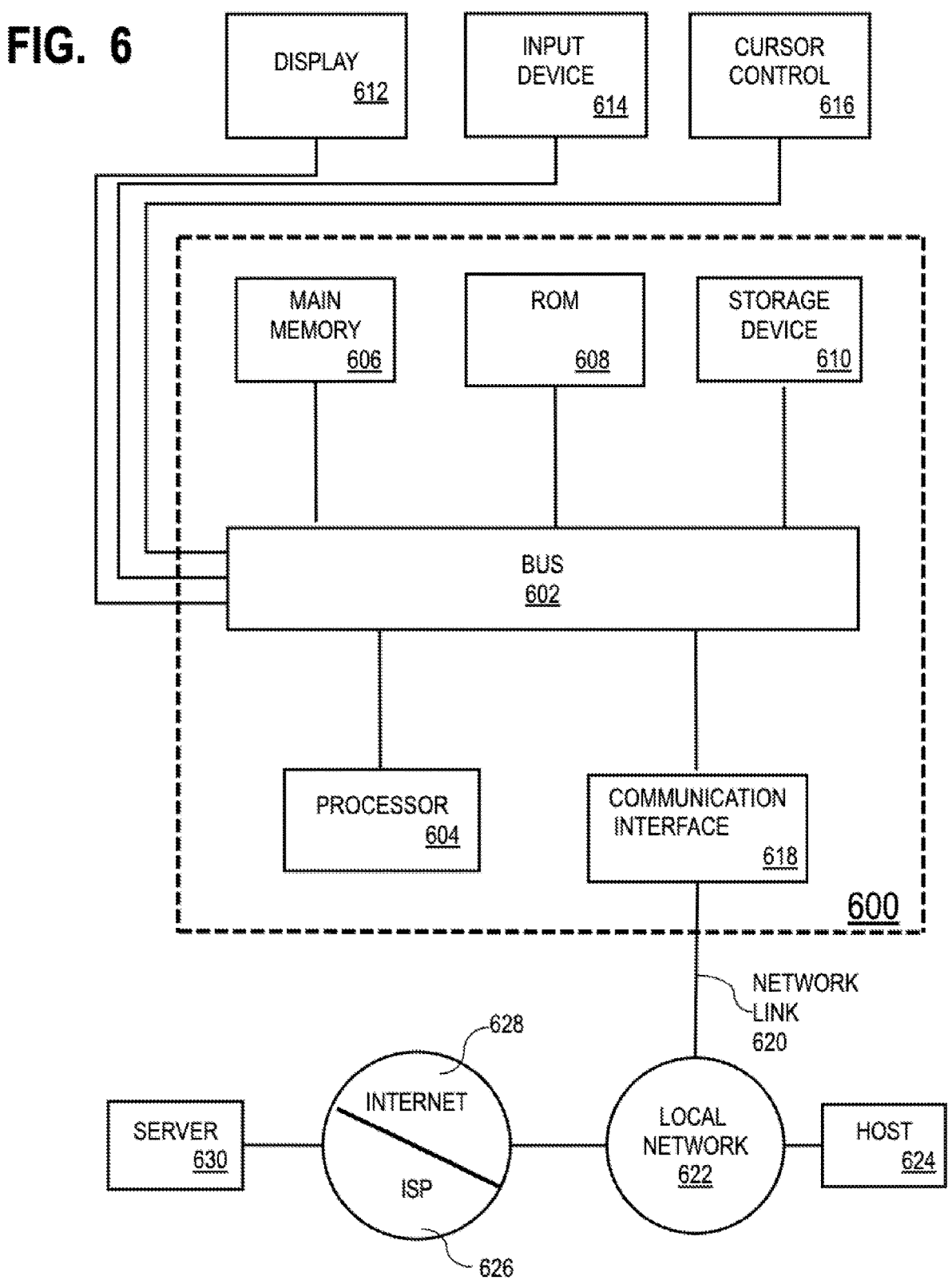
FIG. 6 depicts a block diagram that illustrates a computer system in accordance with one or more embodiments.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer-readable media comprising instructions which, when executed by one or more hardware processors, cause performance of operations comprising:

obtaining a plurality of forms, each form (a) being associated with a form type, (b) comprising a respective set of fields, and (c) comprising a respective set of values for the respective set of fields;

predicting a first association between a first form type and a second form type based at least on historical usage of the first form type and the second form type together;

predicting a second association between a first field in-a the first form type with a second field in the second form type based at least on (a) values for the first field in a first subset of the plurality of forms that are of the first form type and (b) values for the second field in a second subset of the plurality of forms that are of the second form type;

based on predicting the first association between the first form type and the second form type and predicting the second association between the first field in the first form type and the second field in the second form type: storing a mapping between the first field in the first form type and the second field in the second form type;

receiving a first user input comprising a particular value corresponding to the first field in a first target form of the first form type;

storing the particular value in relation to the first field in the first target form; and based at least on the mapping between the first field in the first form type and the second field in the second form type: storing the particular value in relation to the second field in a second target form of the second form type.

2. The one or more non-transitory computer-readable media of claim 1, wherein the operations further comprise:

training a machine learning model using sets of training data, each set of training data defining associations between different fields in different form types;

wherein the predicting the second association between the first field in the first form type and the second field in the second form type comprises applying the machine learning model;

receiving feedback for the predicted second association between the first field in the first form type and the second field in the second form type; and updating the machine learning model based on the feedback.

3. The one or more non-transitory computer-readable media of claim 1, wherein predicting the first association between the first form type and the second form type is based on a frequency with which forms of the first form type are submitted concurrently with forms of the second form type.

4. The one or more non-transitory computer-readable media of claim 1, wherein storing the particular value in relation to the second field in the second target form is based further on user characteristics that are used to determine an association between the first field in the first target form and the second field in the second target form.

5. The one or more non-transitory computer-readable media of claim 1, wherein the operations further comprise: generating an explanation for the predicted second association between the first field of the first form type and the second field of the second form type.

6. The one or more non-transitory computer-readable media of claim 1, wherein the operations further comprise: displaying a visual indication in relation to the second field in the second target form that indicates the second field was auto-completed, without receiving user input in relation to the second field in the second target form.

7. The one or more non-transitory computer-readable media of claim 1, wherein at least one of the first target form or the second target form was selected, by a system, for completion by a user based at least on: historical data, a pattern of form completion, and/or an upcoming form completion requirement.

8. The one or more non-transitory computer-readable media of claim 1, wherein the operations further comprise: prior to storing the mapping between the first field in the first form type and the second field in the second form type:

presenting, in a graphical user interface (GUI), the second association between the first field in the first form type and the second field in the second form type as a first candidate association for user approval;

receiving, via the GUI, a second user input approving the first candidate association between the first field in the first form type and the second field in the second form type, wherein the mapping between the first field in the first form type and the second field in the second form type is stored in response to receiving the second user input;

predicting a third association between a third field in the first form type and a fourth field in the second form type based at least on (a) values for the third field in the first subset of the plurality of forms that are of the first form type and (b) values for the fourth field in the second subset of the plurality of forms that are of the second form type;

presenting, in the GUI, the third association between the third field in the first form type and the fourth field in the second form type as a second candidate association for user approval;

receiving, via the GUI, a third user input disapproving the second candidate association between the third field in the first form type and the fourth field in the second form type; and responsive to receiving the third user input, refraining from mapping the third field in the first form type and to the fourth field in the second form type.

9. The one or more non-transitory computer-readable media of claim 1, wherein storing the second association between the first field in the first form type and the second field in the second form type comprises:

generating a data form comprising a data field, the data field being mapped to (a) the first field in the first form type and (b) the second field in the second form type; and wherein receiving the first user input comprises:

presenting the data form; and receiving, in relation to the data field of the data form, the first user input comprising the particular value.

10. A method comprising:

obtaining a plurality of forms, each form (a) being associated with a form type, (b) comprising a respective set of fields, and (c) comprising a respective set of values for the respective set of fields;

predicting a first association between a first form type and a second form type based at least on historical usage of the first form type and the second form type together;

predicting a second association between a first field in the first form type with a second field in the second form type based at least on (a) values for the first field in a first subset of the plurality of forms that are of the first form type and (b) values for the second field in a second subset of the plurality of forms that are of the second form type;

based on predicting the first association between the first form type and the second form type and predicting the second association between the first field in the first form type and the second field in the second form type:

storing a mapping between the first field in the first form type and the second field in the second form type;

receiving a first user input comprising a particular value corresponding to the first field in a first target form of the first form type;

storing the particular value in relation to the first field in the first target form; and based at least on the mapping between the first field in the first form type and the second field in the second form type: storing the particular value in relation to the second field in a second target form of the second form type, wherein the method is performed by at least one device including a hardware processor.

11. The method of claim 10, further comprising:

training a machine learning model using sets of training data, each set of training data defining associations between different fields in different form types;

wherein the predicting the second first association between the first field in the first form type and the second field in the second form type comprises applying the machine learning model;

receiving feedback for the predicted second first association between the first field in the first form type and the second field in the second form type; and updating the machine learning model based on the feedback.

12. The method of claim 10, wherein predicting the first association between the first form type and the second form type is based on a frequency with which forms of the first form type are submitted concurrently with forms of the second form type.

13. The method of claim 10, wherein storing the particular value in relation to the second field in the second target form is based further on user characteristics that are used to determine an association between the first field in the first target form and the second field in the second target form.

14. The method of claim 10, wherein the operations further comprise: generate generating an explanation for the predicted second association between the first field of the first form type and the second field of the second form type.

15. The method of claim 10, wherein the operations further comprise: displaying a visual indication in relation to the second field in the second target form that indicates the second field was auto-completed, without receiving user input in relation to the second field in the second target form.

16. The method of claim 10, wherein at least one of the first target form or the second target form was selected, by a system, for completion by a user based at least on:

historical data, a pattern of form completion, and/or an upcoming form completion requirement.

17. The method of claim 10, further comprising:

prior to storing the mapping between the first field in the first form type and the second field in the second form type:

presenting, in a graphical user interface (GUI), the second association between the first field in the first form type and the second field in the second form type as a first candidate association for user approval;

receiving, via the GUI, a second user input approving the first candidate association between the first field in the first form type and the second field in the second form type;

wherein the mapping between the first field in the first form type and the second field in the second form type is stored in response to receiving the second user input;

predicting a third association between a third field in the first form type and a fourth field in the second form type based at least on (a) values for the third field in the first subset of the plurality of forms that are of the first form type and (b) values for the fourth field in the second subset of the plurality of forms that are of the second form type;

presenting, in the GUI, the third association between the third field in the first form type and the fourth field in the second form type as a second candidate association for user approval;

receiving, via the GUI, a third user input disapproving the second candidate association between the third field in the first form type and the fourth field in the second form type; and responsive to receiving the third user input, refraining from mapping the third field in the first form type to the fourth field in the second form type.

18. The method of claim 10, wherein the mapping between the first field in the first form type and the second field in the second form type comprises:

generating a data form comprising a data field, the data field being mapped to (a) the first field in the first form type and (b) the second field in the second form type; and wherein receiving the first user input comprises:

presenting the data form; and receiving, in relation to the data field of the data form, the first user input comprising the particular value.

19. A system comprising:

at least one device including a hardware processor;

the system being configured to perform operations comprising:

obtaining a plurality of forms, each form (a) being associated with a form type, (b) comprising a respective set of fields, and (c) comprising a respective set of values for the respective set of fields;

predicting a first association between a first form type and a second form type based at least on historical usage of the first form type and the second form type together;

predicting a second association between a first field in the first form type with a second field in the second form type based at least on (a) values for the first field in a first subset of the plurality of forms that are of the first form type and (b) values for the second field in a second subset of the plurality of forms that are of the second form type;

based on predicting the first association between the first form type and the second form type and predicting the second association between the first field in the first form type and the second field in the second form type: storing a mapping between the first field in the first form type and the second field in the second form type;

receiving a first user input comprising a particular value corresponding to the first field in a first target form of the first form type;

storing the particular value in relation to the first field in the first target form; and based at least on the mapping between the first field in the first form type and the second field in the second form type: storing the particular value in relation to the second field in a second target form of the second form type.

20. The system of claim 19, wherein the operations further comprise:

training a machine learning model using sets of training data, each set of training data defining associations between different fields in different form types;

wherein the predicting the second association between the first field in the first form type and the second field in the second form type comprises applying the machine learning model;

receiving feedback for the predicted second association between the first field in the first form type and the second field in the second form type; and updating the machine learning model based on the feedback.

* * * * *